May 26, 1970  KARL-ERNST TIMMERBEIL  3,513,622

PACKAGING OF ARTICLES

Filed Aug. 3, 1967  3 Sheets-Sheet 1

INVENTOR
KARL ERNST TIMMERBEIL

BY McGlew and Toren

ATTORNEYS

INVENTOR
KARL ERNST TIMMERBEIL

May 26, 1970     KARL-ERNST TIMMERBEIL     3,513,622
PACKAGING OF ARTICLES

Filed Aug. 3, 1967     3 Sheets-Sheet 3

INVENTOR
KARL ERNST TIMMERBEIL

BY *MuGlaw and Toren*

ATTORNEYS

United States Patent Office 3,513,622
Patented May 26, 1970

---

3,513,622
PACKAGING OF ARTICLES
Karl-Ernst Timmerbeil, Ennepetal 101,
Muhlinghausen, Germany
Filed Aug. 3, 1967, Ser. No. 658,133
Int. Cl. B65b 57/74, 11/22
U.S. Cl. 53—59                                5 Claims

ABSTRACT OF THE DISCLOSURE

In a method and apparatus for wrappng articles in shrinkable thermoplastic foil, the article moves along a first conveyor until it strikes a barrier which triggers a transfer device to displace the article laterally of the first conveyor and onto a second conveyor extending parallel to the first conveyor. Between the first and second conveyors, a curtain of shrinkable thermoplastic foil extends vertically in a plane which is parallel to the direction of the two conveyors. During transfer of the article, the article causes this curtain of foil to wrap around the article, and welding means seal the foil curtain behind the article and also weld together the two ends of the severed curtain. As the article travels along the second conveyor, it intercepts a photoelectric barrier causing welding jaws to clamp and seal the forwardly projecting open end of the foil wrapping, the second conveyor being halted momentarily for this purpose. The article then travels onto a third conveyor forming a continuation of the second conveyor and, as the article clears a second photoelectric barrier on the receiving end of the third conveyor, the welding jaws seal the projecting open trailing end of the foil sleeve. The article then passes through a heating tunnel which causes the foil to shrink tightly around the article.

---

The invention relates to a method and device for packaging individual items by means of a synthetic plastics material foil, in particular through the heat action of shrinkable thermoplastic synthetic plastics material foil, the goods to be packaged being wrapped up with the foil and sealed in by closing the side apertures of the foil wrapping.

For packaging individual articles in plastic foils, machines of the most varied forms of embodiment are known. The individual articles to be packaged are wrapped up with a foil blank and the side apertures closed by weld seams formed by means of welding jaws. The known machines must, however be adjusted to the size of the individual articles to be packaged before they are put into operation. The packaging of individual articles of different sizes is very difficult, for the machines must be readjusted for each different size. For this reason packaging individual articles of differing size in nonselective sequence is not possible. The necessity of the frequent readjustment of machines in many cases impairs the efficiency and the operating reliability of the packaging machines.

Further packaging machines have become known, which sense the individual articles to be packaged and then adjust the necessary devices for the packaging process to the sensed size. This method is technically very costly however.

It is the object of the invention to provide a method and device for performing this process, which make possible an automatic adaptation of the pack form to the size of the individual article to be packaged, without an additional technical expenditure being necessary for this purpose. In addition the elements determining the form of the pack do not move, so that, with respect to the known packaging machines, a smaller technical expenditure results. In accordance with the invention, the goods to be packaged are conveyed on a horizontal guideway through a vertical foil path, are wrapped with an open ended foil sleeve and the section of foil forming the wrapping is separated from the foil path with the formation of a closure seam running transverse to the forward feed direction of the packaging goods. Subsequently the edge sections, turned towards one another and projecting laterally beyond the packaging goods, of the opposite apertures of the wrapping are joined together. The commodity wrapped by means of the foil is transferred from its forward feed path to a guideway running transversely to this and, during a further photoelectrically-controlled forward feed of the goods, first the front aperture of the wrapping is closed and, after a further advance corresponding to the length of the commodity, the rear aperture is closed.

In accordance with a further feature of the invention the forward feed of the wrapped packaging goods is interrupted on reaching the closure member, the front aperture of the wrapping is closed, the further advance of the packaging commodity undertaken, this again being interrupted on reaching the closure member through the rear end of the packaging commodity, the rear aperture of the wrapping being closed and then the further advance of the packaging commodity being effected.

In accordance with a further feature of the invention, the forward movement of the wrapped article is interrupted when the article reaches a closure member, and the open forward end of the wrapping sleeve is sealed closed. The forward movement of the article is then restarted and, as the open trailing end of the sleeve reaches the closure member, the forward movement is interrupted and the open trailing end of the sleeve is sealed closed. The forward movement of the article is then restarted.

The apparatus for performing the method of the invention includes a first conveyor belt which receives the article for movement therealong. A second conveyor belt extends parallel to the first conveyor belt, from adjacent the outlet end of the first conveyor belt, and is transversely offset from the first conveyor belt. A third conveyor belt forms a continuation of the second conveyor belt. Transfer means are provided at the discharge end of the first conveyor belt to move an article laterally from the first conveyor belt to the second conveyor belt. Between the first and second conveyor belts, there are provided movable cooperable welding jaws and a vertically oriented curtain of foil material extends in a plane parallel to the direction of movement of the first and second conveyor belts. The transfer members force the article against this curtain to wrap a sleeve of foil around the article, and the sleeve is severed from the curtain, and welded closed behind the article, with the severed ends of the curtain being rewelded together. As the article, wrapped in an open ended foil sleeve, moves along the second conveyor belt, it passes through a first photoelectric barrier, and the second conveyor belt stops while welding jaws weld closed the forwardly projecting open end of the sleeve. The article is then transferred from the second conveyor to the third conveyor and, as the article clears a second photoelectric barrier, the second conveyor is stopped and the welding jaws weld closed the trailing open end of the foil sleeve. The article then passes through a heating tunnel which shrinks the foil tightly around the article.

The foil curtain has a width greater than the length of the article, and the barrier adjacent the discharge end of the first conveyor is provided with a contact sensor impacted by the article for controlling the operation of the transfer members.

For an understanding of the principles of the invention, reference is made to the following description of a typical embodiment thereof as illustrated in the accompanying drawings.

DESCRIPTION OF THE PREFERRED EMBODIMENTS

Figure 1:
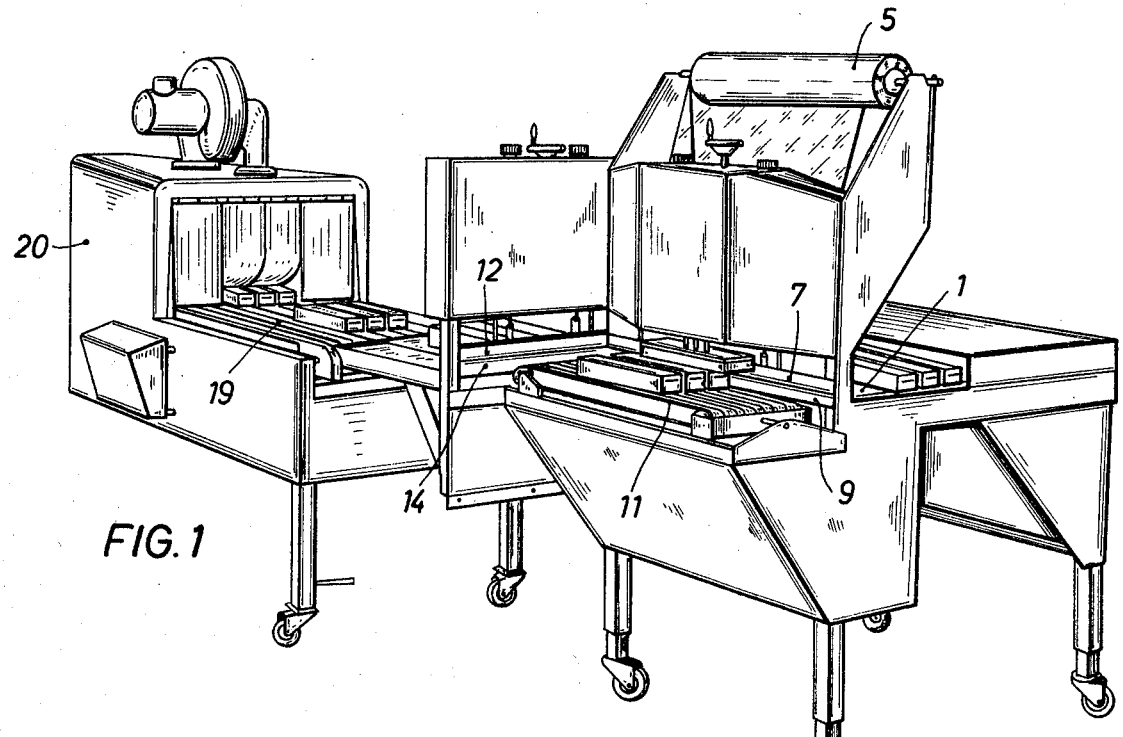
FIG. 1 is a somewhat diagrammatic perspective view of the apparatus for performing the invention method.
Figure 3:
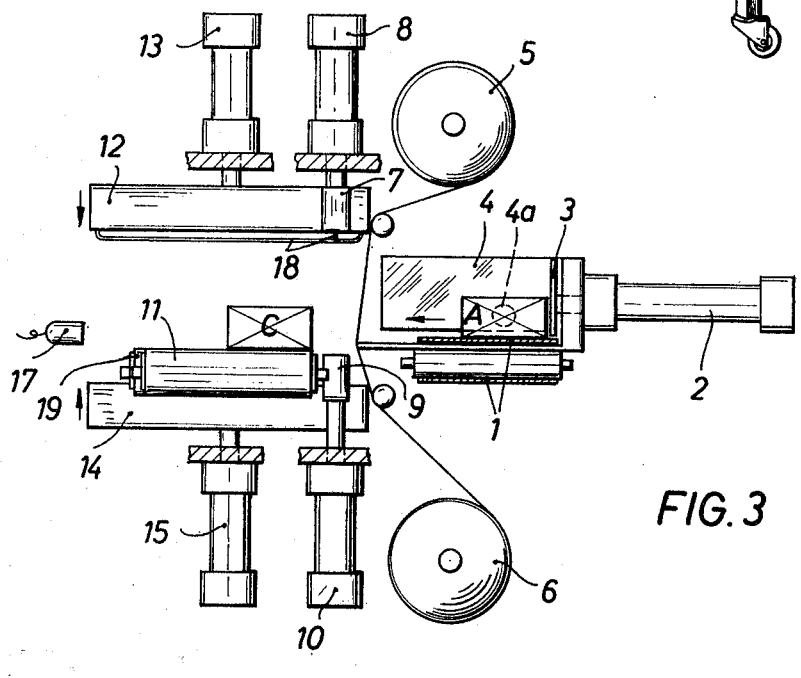
FIG. 3 is a view taken on the line III—III of FIG. 2.
Figure 2:
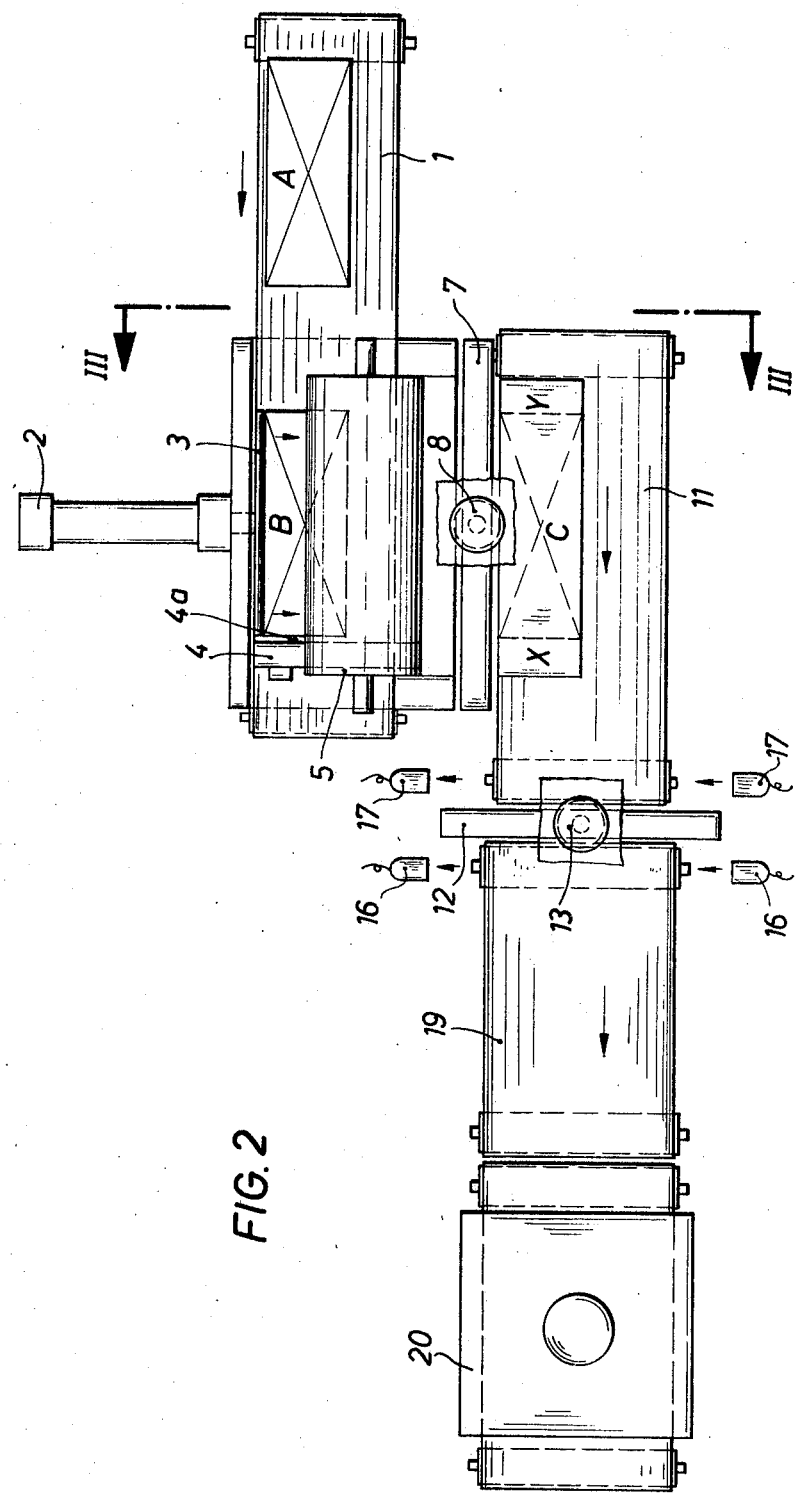
FIG. 2 is a plan view of the apparatus.
Figure 4:
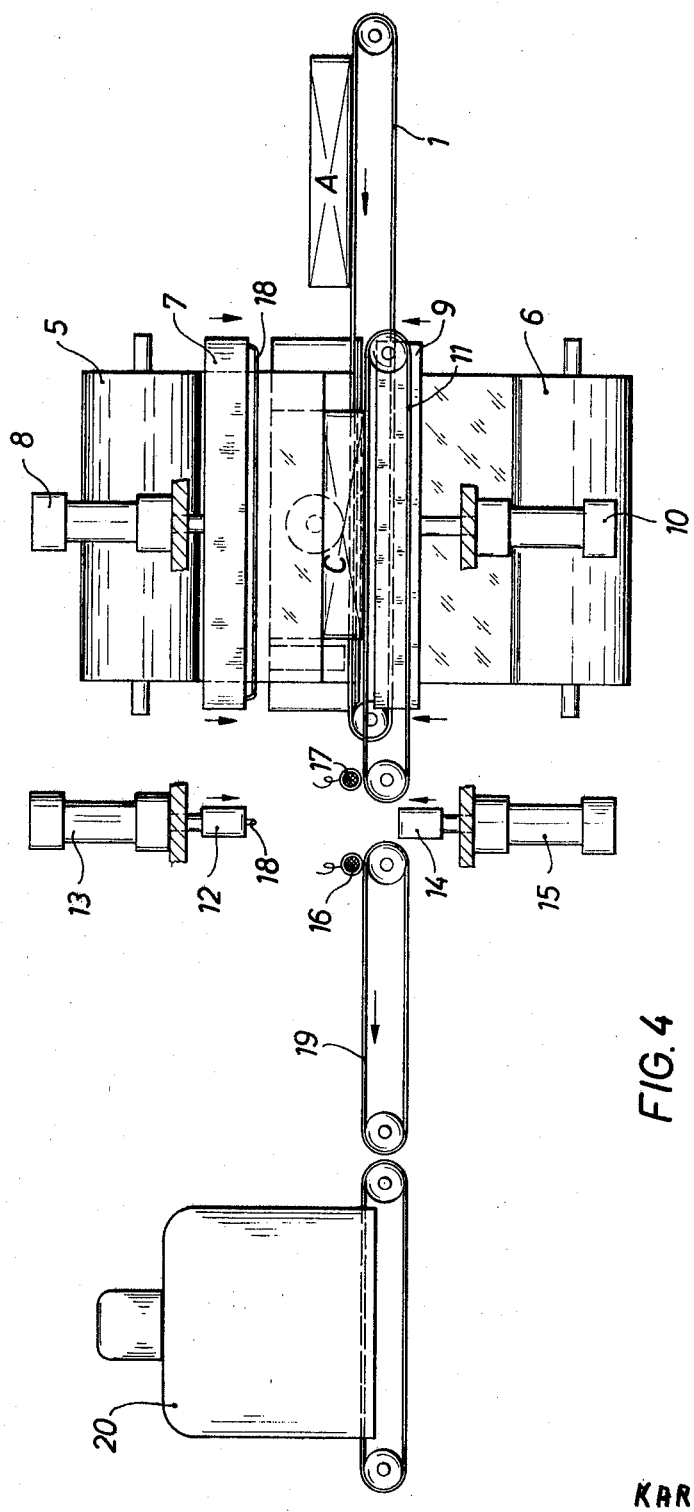
FIG. 4 is a side elevation view, partly in section, of the apparatus.

The method in accordance with the invention is performed, by means of the preferred form of embodiment represented in FIGS. 1 to 4 of the packaging device in the following manner:

The device comprised of a feed belt 1, which is led over guide rollers and which has, on the output side, an impact member or barrier 4, which is arranged transversely to the direction of movement of the belt and is provided with a release contact or contact sensor 4a. The commodity conveyed by means of the feed belt 1 engages the impact member or barrier 4 and actuates simultaneously the release contact 4a, which initiates the forward feed movement of a transfer member arranged laterally near the feed belt 1. The transfer member comprises a fluid pressure actuator 2 connected to a supply of compressed air and operating a slide 3 extending parallel to belt 1. Slide 3, in its movement transversely of conveyor or belt 1 by actuator 2, moves the commodity or article, which has been transferred from position A to position B by belt 1, from position B to position C. When the article reaches position C, slide 3 is retracted by actuator 2 to its starting position.

During the forward feed of the commodity from position B to position C, the commodity is moved against a foil sheet guided vertically and parallel to the feed belt 1, which sheet comprises a foil curtain formed between supply rolls 5 and 6. According to the length or size, respectively, of the commodity a corresponding section of foil is drawn off of the supply rolls 5 and 6. At the same time the commodity is wrapped up by a section of the foil sheet. The separation of the foil section of the sheet forming the wrapping is effected by means of two welding jaws 7 and 9 which can work in opposite directions. The movement of these welding jaws 7, 9 is effected through the fluid pressure actuators 8 and 10. In the working position of the welding jaws 7 and 9, the foils drawn off of the rolls 5 and 6 are pressed together and severed by a hot wire 18 provided on the welding jaws, the front faces of the cut surfaces of the upper and lower foils being welded together simultaneously. In this way there is wrapped around the article or commodity a foil sleeve having a welded seam at its front side and a welded seam at its rear side. Simultaneously, the remaining foils drawn from rolls 5 and 6 are welded together to again form a closed foil curtain against which the following article to be packaged is moved by the transfer member. In place of commercial synthetic plastic material foil, there can also be used, for the packaging material, thermoplastic synthetic plastic material foil which is shrinkable or contractible by the action of heat. The width of the foil sheet used is somewhat greater than the width of the goods to be packaged, so that the wrapping sleeve surrounding the commodity projects beyond the commodity at the opposite open ends of the sleeve.

At the output side of the feed belt 1 a conveyor belt 11 is arranged parallel thereto and delivers an output belt 19 at its outlet side. The commodity is transferred to the conveyor belt 11 from the feed belt 1 transversely to the directions of movement of the two belts 1 and 11. By means of the conveyor belt 11, the foil-wrapped commodity is conveyed to a further welding device 12, 14, which is arranged between the two belts 11 and 19. As the commodity is conveyed along conveyor 19, after transfer thereto from conveyor belt 11, the article is wrapped in an open ended sleeve. The open end face X forms the front end and the open end face Y the rear end of the packaging sleeve. The welding jaws 12, 14 are operated by means of the fluid pressure actuators 13, 15. In front of the welding devices 12 and 14, there is arranged a photoelectric barrier 17. As soon as the commodity interrupts the light ray of the photoelectric barrier, and as the projecting transparent foil section at the end face X of the sleeve does not offer any obstruction to passage of the light ray of the photoelectric barrier, further movement of conveyor belt 19 is stopped. Simultaneously, welding jaws 12 and 14 are moved toward each other and, by means of the welding jaws 12 and 14, the end face of the packaging at X is closed, the waste strip thus arising being blown away by means of an air jet. For this purpose there is arranged in the vicinity of the welding device 12, 14, a nozzle supplied with a flow of compressed air. After the welding has been effected the welding jaws 12 and 14 are opened. Simultaneously the conveyor belt 11 is set in movement and the commodity transferred to the lead off belt 19 moving synchronously with the conveyor belt 11. Behind the welding jaws 12 and 14 there is provided a further photoelectric barrier 16. If now, during the transfer of the commodity from the conveyor belt 11 to the lead off belt 19, the barrier 16 is cleared by the commodity, then the belts 11 and 19 again stop so that now the rear end face Y of the packaging sleeve can be closed by application of a second weld seam by means of the same welding jaws 12 and 14. The waste strip arising here is blown away in corresponding manner by means of compressed air. The packaging is thus finished. In the case of using contraction foils, the commodity, surrounded on all sides by the foil, is conveyed, by means of the lead off belt 19, to a contraction tunnel 20, in which, under the action of heat, the foil is shrunk and closely surrounds the commodity.

In accordance with the method according to the invention, by using the device represented and described, the commodity is enclosed between two foil sheets welded on all four sides so that the commodity is packaged in a rectangular bag, which, with the use of contraction foil, in the continuation of the packaging through a contraction tunnel is shrunk skin-tight on to the commodity. In accordance with the invention the advantage is achieved that an automatic adaptation of the pack form to the size of the goods is possible. The device constructed according to the invention adapts itself automatially to the most varied sizes of goods. A readjustment of the device with a change of commodity size is no longer necessary, and speed of operation of the device can therefore be considerably increased. Commodities of the most varied forms can be selectively packaged at random, without the device having to be readjusted each time. The device can in addition be provided with counting devices. In this connection the production of collective packagings and counting of the individual articles is possible, so that an endless feeding of the device is possible. By inserting the commodity in the packaging material and by the applictaion of corresponding weld seams there is placed around the commodity a tightly sealed and smooth flat bag, so that subsequent shrinking of the packaging material is saved. If the opposite open end faces of the wrapping applied around the commodity are not closed then the device in accordance with the invention can also be used as a sleeve banderole forming machine.

What is claimed is:

1. In apparatus for packaging articles and commodities in heat-sealable plastic foil, of the type including means providing a vertically oriented curtain of foil extending above and below a transport surface for the product to be packaged and against which the product is displaced to wrap a sleeve of the foil around the product, welding means operable to seal the sleeve behind the product, to sever it from the curtain of foil and to weld unite the severed ends of the foil curtain, and sealing means operable, during transport of the product, to seal the open ends of the foil sleeve wrapped therearound: the improvement comprising, in combination, transfer members adjacent the discharge end of said transport surface and operable to move the product off a delivery side of said transport surface; a conveyor extending transversely of the delivery side of said transport surface; said foil curtain being positioned between said delivery side of said transport surface and said conveyor; a further conveyor in series with said first-mentioned conveyor to receive the product from the latter; a pair of relatively movable welding jaws positioned between said first-mentioned conveyor and said further conveyor and extending transversely of the path of movement of the product, said jaws being movable toward each other to effect a sealing operation; a first photoelectric barrier in advance of said welding jaws and operable, when intercepted by the product on the first-mentioned conveyor, to stop movement of the first-mentioned conveyor and to initiate operation of said welding jaws to weld closed the leading open end of the foil sleeve on the product; and a second photoelectric barrier extending across said further conveyor immediately beyond said welding jaws and operable, when cleared by the product, to stop movement of said further conveyor and to initiate movement of said welding jaws to seal closed the trailing open end of the foil sleeve.

2. Apparatus, as claimed in claim 1, in which the material of said foil curtain is heat shrinkable plastic foil; and heating means receiving the wrapped product from said further conveyor and heating the wrapping to shrink the wrapping tightly around the product.

3. Apparatus, as claimed in claim 2, in which said transport surface is a feed conveyor; said transfer members being adjacent the discharge end of said feed conveyor and operable to move the product transversely of the latter to said delivery side; and first-mentioned conveyor extending parallel to said feed conveyor; said foil curtain extending between said first-mentioned conveyor and said feed conveyors, in a vertical plane which is parallel to the direction of movement of said first-mentioned conveyor and said feed conveyor.

4. Apparatus, as claimed in claim 3, including an abutment member extending across said feed conveyor adjacent said transfer members and engageable by a product on said feed conveyor; and means operatively associated with said abutment member and effective to initiate operation of said transfer members responsive to a product engaging said abutment member.

5. Apparatus, as claimed in claim 4, in which said means operatively associated with said abutment member comprises a switch having a switch operator projecting from said abutment member for engagement by a product on said feed conveyor.

References Cited

UNITED STATES PATENTS 3,191,356    6/1955    Zelnick et al. _____ 53—182

FOREIGN PATENTS 1,176,554    8/1964    Germany.

THERON E. CONDON, Primary Examiner

N. ABRAMS, Assistant Examiner

U.S. Cl. X.R.

53—76, 184, 229, 373